(12) United States Patent
Boehme et al.

(10) Patent No.: US 10,783,115 B2
(45) Date of Patent: *Sep. 22, 2020

(54) DIVIDING A DATASET INTO SUB-DATASETS HAVING A SUBSET OF VALUES OF AN ATTRIBUTE OF THE DATASET

(71) Applicant: International Business Machines Corporation, Armonk, NY (US)

(72) Inventors: Thomas F. Boehme, Boeblingen (DE); Andreas Brodt, Gerlingen (DE); Namik Hrle, Boeblingen (DE); Oliver Schiller, Dettingen unter Teck (DE)

(73) Assignee: International Business Machines Corporation, Armonk, NY (US)

( * ) Notice: Subject to any disclaimer, the term of this patent is extended or adjusted under 35 U.S.C. 154(b) by 62 days.

This patent is subject to a terminal disclaimer.

(21) Appl. No.: 16/005,839

(22) Filed: Jun. 12, 2018

(65) Prior Publication Data

US 2018/0293250 A1   Oct. 11, 2018

Related U.S. Application Data

(63) Continuation of application No. 15/231,858, filed on Aug. 9, 2016, now Pat. No. 10,025,511, which is a
(Continued)

(51) Int. Cl.
*G06F 11/14* (2006.01)
*G06F 11/00* (2006.01)
(Continued)

(52) U.S. Cl.
CPC ........... *G06F 16/162* (2019.01); *G06F 3/065* (2013.01); *G06F 3/067* (2013.01); *G06F 3/0619* (2013.01);
(Continued)

(58) Field of Classification Search
CPC .. G06F 16/162; G06F 16/2264; G06F 16/245; G06F 16/22; G06F 16/27;
(Continued)

(56) References Cited

U.S. PATENT DOCUMENTS 395,781 A    1/1889  Hollerith
6,931,390 B1 8/2005  Zait et al.
(Continued)

OTHER PUBLICATIONS

IBM: List of IBM Patents or Patent Applications Treated as Related (Appendix P), Oct. 12, 2018, pp. 1-2.
(Continued)

*Primary Examiner* — Michael Krofcheck
(74) *Attorney, Agent, or Firm* — L. Jeffrey Kelly

(57) ABSTRACT

Sorting and storing a dataset, the dataset comprising at least one attribute. The method includes defining a set of data blocks and assigning to each data block a predefined maximum number of entries or a predefined maximum amount of storage, dividing the dataset into a sequence of multiple sub-datasets each having one value or a range of values of the attribute, wherein each pair of successive sub-datasets of the sequence are non-overlapping or overlapping at their respective extremum value of the attribute, for each sub-dataset of the multiple sub-datasets: in case the sub-dataset fully or partially fits into a data block of the defined data blocks storing the sub-dataset into at least the data block, the sub-dataset that partially fits into the data block comprising a number of entries that is smaller than a predefined maximum threshold.

10 Claims, 6 Drawing Sheets

Related U.S. Application Data continuation of application No. 15/229,277, filed on Aug. 5, 2016, now Pat. No. 9,852,141, which is a continuation of application No. 14/944,256, filed on Nov. 18, 2015, now Pat. No. 9,442,694.

(51) Int. Cl.
| | |
|---|---|
| *G06F 3/06* | (2006.01) |
| *G06F 16/16* | (2019.01) |
| *G06F 7/36* | (2006.01) |
| *G06F 16/22* | (2019.01) |
| *G06F 16/27* | (2019.01) |
| *G06F 16/245* | (2019.01) |
| *G06F 16/28* | (2019.01) |

(52) U.S. Cl.
CPC .............. *G06F 7/36* (2013.01); *G06F 11/00* (2013.01); *G06F 11/1402* (2013.01); *G06F 11/1435* (2013.01); *G06F 11/1453* (2013.01); *G06F 16/22* (2019.01); *G06F 16/2264* (2019.01); *G06F 16/245* (2019.01); *G06F 16/27* (2019.01); *G06F 16/283* (2019.01); *G06F 2201/80* (2013.01); *G06F 2201/84* (2013.01)

(58) Field of Classification Search
CPC ...... G06F 16/283; G06F 3/0619; G06F 3/065; G06F 11/00; G06F 3/067; G06F 11/1453; G06F 11/1435; G06F 7/36; G06F 2201/84
See application file for complete search history.

(56) References Cited

U.S. PATENT DOCUMENTS

| | | | |
|---|---|---|---|
| 7,676,510 | B1 | 3/2010 | Karinta |
| 7,877,374 | B2 | 1/2011 | Zabback et al. |
| 7,917,512 | B2 | 3/2011 | Bhide et al. |
| 7,962,489 | B1 | 6/2011 | Chiang et al. |
| 8,209,294 | B2 | 6/2012 | Shankar et al. |
| 8,521,748 | B2 | 8/2013 | Slezak et al. |
| 8,935,257 | B1 | 1/2015 | Vemuri et al. |
| 8,943,100 | B2 | 1/2015 | Slezak et al. |
| 8,965,899 | B1 | 2/2015 | Van Rotterdam |
| 8,996,544 | B2 | 3/2015 | Ziauddin et al. |
| 9,442,694 | B1 | 9/2016 | Boehme et al. |
| 9,852,141 | B2 | 12/2017 | Boehme et al. |
| 2005/0203930 | A1 | 9/2005 | Bukowski et al. |
| 2006/0259448 | A1 | 11/2006 | Yeo et al. |
| 2009/0106210 | A1 | 4/2009 | Slezak et al. |
| 2010/0131506 | A1 | 5/2010 | Shintani et al. |
| 2010/0281013 | A1 | 11/2010 | Graefe |
| 2010/0281081 | A1 | 11/2010 | Stager et al. |
| 2012/0124045 | A1 | 5/2012 | Pendap et al. |
| 2014/0095472 | A1 | 4/2014 | Lee et al. |
| 2014/0250142 | A1 | 9/2014 | Pradhan et al. |
| 2014/0258252 | A1 | 9/2014 | Schreter |
| 2015/0088812 | A1 | 3/2015 | Ziauddin et al. |
| 2015/0242452 | A1 | 8/2015 | Dickie et al. |
| 2015/0286682 | A1 | 10/2015 | Ziauddin |
| 2017/0139617 | A1 | 5/2017 | Boehme et al. |

OTHER PUBLICATIONS

Yu et al., "Zoning Multidimensional Access Methods for Analytical Database Applications", Jun. 25, 2011, http://citeseerx.ist.psu.edu/viewdoc/download?doi=10.1.1.59.3388&rep=rep1&type=pdf, 9 pages.

Brodt et al., "Efficient Table Reorganization for Effective Zone Maps in Analytical Databases", IBM Germany Research and Development, Mar. 25, 2015, pp. 1-9.

Pending U.S. Appl. No. 14/919,092, filed Oct. 21, 2015, entitled: "Partitioned Joins in Analytical Databases", 36 pages.

Oracle®, Database Data Warehousing Guide, "Partitioning in Data Warehouses", https://docs.oracle.com/cd/B19306_01/server.102/b14223/parpart.htm, 37 pages, printed on Apr. 17, 2015.

Dewitt et al., "Implementation Techniques for Main Memory Database Systems", 1984, ACM, pp. 1-8.

Oracle®, Database Data Warehousing Guide, "Using Zone Maps", http://docs.oracle.com/database/121/DWHSG/zone_maps.htm, 13 Using Zone Maps, 26 pages, Printed on Apr. 17, 2015.

Graefe et al., "Self-selecting, self-tuning, incrementally optimized indexes", EDBT 2010, Mar. 22-26, 2010, Lausanne, Switzerland, pp. 371-381.

Wikipedia, "Hash join", From Wikipedia, the free encyclopedia, http://en.wikipedia.org/wiki/Hash_join#Hybrid_hash_join.9, Printed on Apr. 17, 2015, pp. 1-4.

Hoare, "Algorithm 64 Quicksort", Communications of the ACM, vol. 4, Issue 7, Jul. 1961, pp. 321-322.

Idreos, "Database Cracking: Towards Auto-tuning Database Kernels", PhD Thesis, Universiteit van Amsterdam, Jun. 24, 2010, pp. 1-270.

IBM, "Introducing DB2 9, Part 2: Table partitioning in DB2 9", Dec. 13, 2010 (First published May 24, 2006), pp. 1-5.

Kersten et al., "Cracking the Database Store", Proceedings of the 2005 CIDR Conference, 12 pages.

Lamb et al., "The Vertica Analytic Database: CStore 7 Years Later", Aug. 27-31, 2012, Instanbul, Turkey, Proceedings of the VLDB Endowment, vol. 5, No. 12, Copyright 2012 VLDB Endowment, pp. 1790-1801.

Cardenas, "Analysis and Performance of Inverted Data Base Structures", IBM research Laboratory, San Jose, Communications of the ACM, May 1975, vol. 18, No. 5, pp. 253-263.

Oracle®, "Oracle Partitioning with Oracle Database 12c Efficient Data Management and Performance Acceleration for every System", Oracle White Paper, Sep. 2014, Oracle® Database 12c, 14 pages.

| Predicate | Rows to skip |
|---|---|
| $c < x$ | rows after the first boundary with $v \geq x$ |
| $c \leq x$ | rows after the first boundary with $v > x$ |
| $c = x$ | (1) rows before the last boundary with $v < x$ and (2) rows after the first boundary with $v > x$ |
| $c \geq x$ | rows before the last boundary with $v < x$ |
| $c > x$ | rows before the last boundary with $v \leq x$ |

DIVIDING A DATASET INTO SUB-DATASETS HAVING A SUBSET OF VALUES OF AN ATTRIBUTE OF THE DATASET

BACKGROUND

The present invention relates to a method, system, and computer program product in the field of digital computer systems, and more specifically, to a method, system, and computer program product for storing a dataset.

Analytical database systems manage very large amounts of data and are optimized for queries that must read large portions of it. At the same time, they offer the complete querying power of Structured Query Language (SQL). As such systems do not focus on online transaction processing (OLTP) load (i.e. involving point queries) they typically do not index each data row, but heavily rely on scan performance. Nevertheless, to speed up scan performance, analytical database systems often store information on blocks of data. Over the years, there is a continuous need to developing improved sort technologies, in order to handle the data expansion that has occurred, both in volume and use of data.

SUMMARY

In an aspect, the invention relates to a computer implemented method for sorting and storing a dataset, the dataset comprises at least one attribute. The method comprises (a) defining a set of data blocks and assigning to each data block of the set of data blocks a predefined maximum number of entries of the dataset or a predefined maximum amount of storage, (b) dividing the dataset into a sequence of multiple sub-datasets, each having one value or a range of values of the attribute, wherein each pair of successive sub-datasets of the sequence are non-overlapping or overlapping at their respective extremum value of the attribute, (c) for each sub-dataset of the multiple sub-datasets, in case the sub-dataset fully or partially fits into a data block of the defined data blocks storing the sub-dataset into at least the data block, otherwise repeating steps (b)-(c) for the sub-dataset as being the dataset, the sub-dataset that partially fits into the data block comprising a number of entries that is smaller than a predefined maximum threshold, and (d) creating, for each data block of the set of data blocks that comprises data, an attribute value information indicating a range of values of the attribute stored on the data block for selectively processing at least part of the set data blocks using the attribute value information.

In another aspect, the invention relates to a computer system for sorting and storing a dataset, the dataset comprises at least one attribute. The computer system is configured for (a) defining a set of data blocks and assigning to each data block of the set of data blocks a predefined maximum number of entries of the dataset or a predefined maximum amount of storage, (b) dividing the dataset into a sequence of multiple sub-datasets, each having one value or a range of values of the attribute, wherein each pair of successive sub-datasets of the sequence are non-overlapping or overlapping at their respective extremum value of the attribute, (c) for each sub-dataset of the multiple sub-datasets: in case the sub-dataset fully or partially fits into a data block of the defined data blocks storing the sub-dataset into at least the data block, otherwise repeating steps (b)-(c) for the sub-dataset as being the dataset, the sub-dataset that partially fits into the data block comprising a number of entries that is smaller than a predefined maximum threshold, and (d) creating, for each data block of the set of data blocks, an attribute value information indicating a range of values of the attribute stored on the data block for selectively processing at least part of the set data blocks using the attribute value information.

In another aspect, the invention relates to a computer program product for sorting and storing a dataset, the dataset comprises at least one attribute, the computer program product comprising a computer readable storage medium having program instructions embodied therewith, the program instructions executable by a processor to (a) define a set of data blocks and assigning to each data block of the set of data blocks a predefined maximum number of entries of the dataset or a predefined maximum amount of storage, (b) divide the dataset into a sequence of multiple sub-datasets each having one value or a range of values of the attribute, wherein each pair of successive sub-datasets of the sequence are non-overlapping or overlapping at their respective extremum value of the attribute, (c) for each sub-dataset of the multiple sub-datasets, in case the sub-dataset fully or partially fits into a data block of the defined data blocks store the sub-dataset into at least the data block, otherwise repeat steps (b)-(c) for the sub-dataset as being the dataset, the sub-dataset that partially fits into the data block comprising a number of entries that is smaller than a predefined maximum threshold, and (d) create for each data block of the set of data blocks, an attribute value information indicating a range of values of the attribute stored on the data block for selectively processing at least part of the set data blocks using the attribute value information.

Embodiments may provide an effective and efficient method of sorting data making use of the smallest units of data (e.g. data blocks) being used. This may speed up the process of sorting compared to conventional methods. Thus the present sorting method may optimize the use of other algorithms such as search and merge algorithms which require input data blocks to be in sorted lists.

BRIEF DESCRIPTION OF THE DRAWINGS

In the following embodiments of the invention are explained in greater detail, by way of example only, making reference to the drawings in which:

FIG. 6 depicts a table listing rows that can be skipped when processing a query predicate on a column of a dataset.

DETAILED DESCRIPTION

Figure 1:
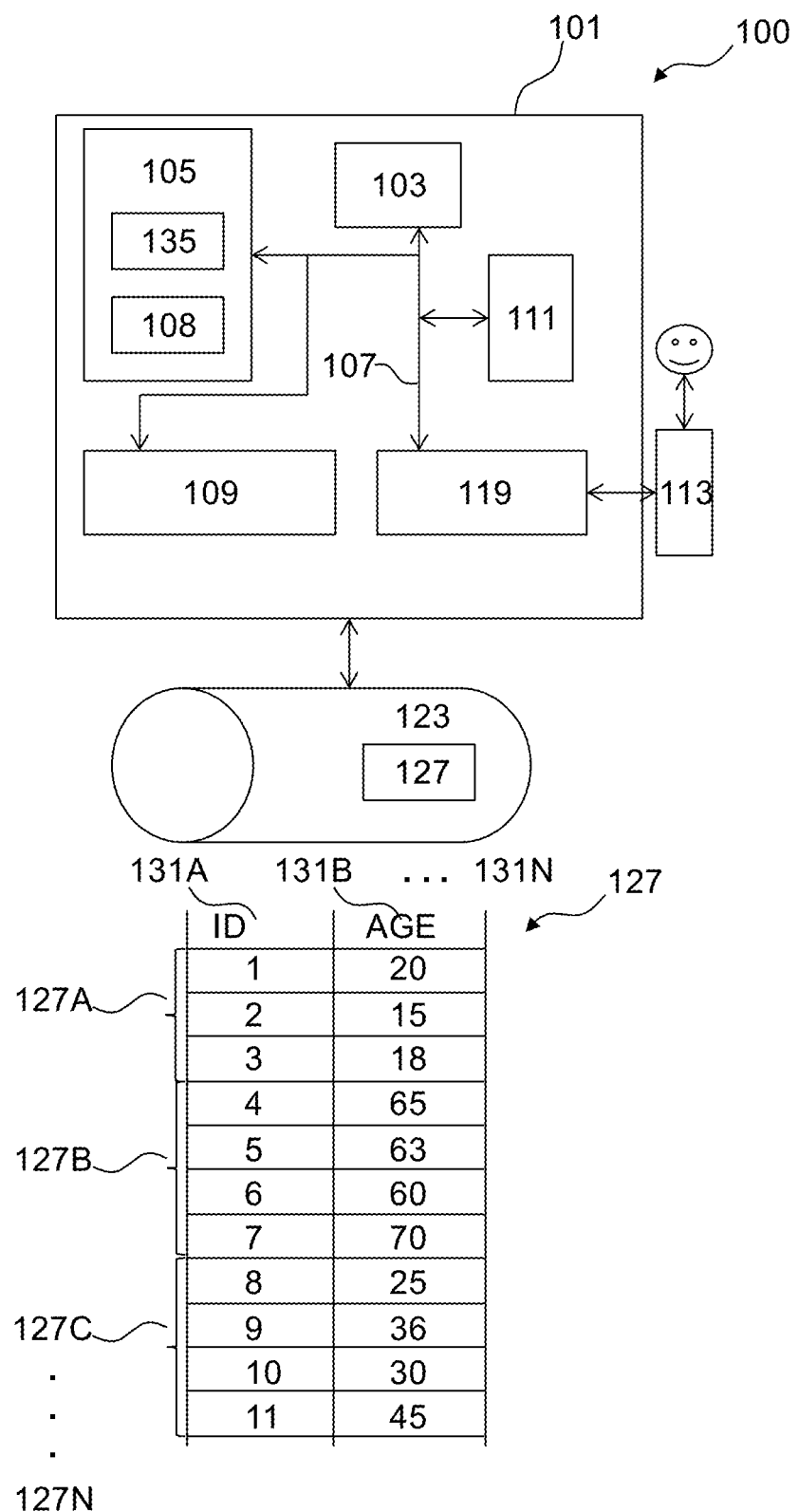
FIG. 1 depicts a functional block diagram illustrating a data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The data blocks may be allocated or assigned physical storage space on a disk and/or a memory of a computer system. The term "disk" as used herein may comprise a hard disk drive (HDD), a direct access storage device (DASD) or a logical unit number (lun) in a storage device. The term "disk" is intended to embrace not only magnetic storage devices, but also optical, solid state and other types of storage devices.

The above features may provide an effective and efficient method of sorting data making use of the smallest units of data (e.g. data block) being used. This may speed up the process of sorting compared to conventional methods. Thus the present sorting method may optimize the use of other algorithms (such as search and merge algorithms) which require input data blocks to be in sorted lists. In other words, the present method may enable to re-organize the dataset into the data blocks.

The selection, using the attribute value information, of candidate data blocks that may be used for processing a query predicate or join may be optimized in that the number of false positive data block candidates (i.e. data block candidates that are selected but did not contain any rows matching the query predicate) may be at least reduced. For example, a constant equality predicate (e. g. "c=17") on a sorted table that has no match in the entire table causes at most one data block to be read. A constant equality predicate that does have matches, causes those blocks to be read that contain the matching rows. Moreover for range predicates (e. g. "c<17") false positives may be avoided. This may speed up the process of accessing the data as sorted by the present method.

With the present method fewest pages may need to be read. Sorting the dataset by column or attribute "c" causes the data to be grouped in the sense that rows with the same value for "c" occur next to each other. Thus, the data density of rows matching an equality or range predicate may be maximal which may lead to better cache utilization and requires fewer I/O operation and CPU cycles.

The division of the dataset may be randomly performed or through a preselection criterion, e.g., using values of the attribute. The random division may particularly be advantageous for the range searches as it may provide sub-datasets that can be equally processed. The preselection based division may be advantageous as it may provide a controlled optimized access to sub-datasets. The preselection criterion may include one of: the sub-dataset are equally sized; the sub-datasets contain the same number of entries.

For example, the dataset may be divided into three sub-datasets e.g. sub1, sub2 and sub3. The sequence of the multiple sub-datasets includes sub1, sub2 and sub3. The sub-datasets sub1, sub2 and sub3 may include data having a range of values of the attribute [min1, max1], [min2, max2] and [min3, max3] respectively where min1<=max1, min2<=max2 and min3<=max3. In this example, (sub1, sub2) forms a pair of (immediate) successive sub-datasets sub1 and sub2, and (sub2, sub3) form another pair of successive sub-datasets. The sequence of sub-dataset sub1, sub2 and sub3 may consist of successive sub-datasets (sub1, sub2) and (sub2, sub3). The attribute value max1 may be smaller or equal to min2. The attribute value max2 may be smaller or equal to min3. Each of min1 min2 and min3 may or may not be equal to max1, max2 and max3 respectively (min1<=max1, min2<=max2 and min3<=max3). If for example sub1 and sub2 are overlapping at their extremum value, this would mean that max1=min2, where max1 is an extremum (i.e. maximum) value for the sub-dataset sub1 and min2 is an extremum (i.e. minimum) value for the sub-dataset sub2.

For example, in case a first sub-dataset of the multiple sub-datasets partially fits into a first data block of the defined data blocks, the first sub-dataset may be stored (split) on the first data block and a second data block of the defined data blocks. This may for example refer to the "tolerated overlap" example described below. For example, the first sub-dataset may comprise a first portion that fits in the first data block, i.e., the number of entries in the first portion is smaller or equal to the number of entries that can still be added to the first data block. That first portion may be stored on the first data block, and the second or remaining portion of the first sub-dataset may be stored on the second data block. After storing the first and second portions, the second data block may or may not be used in order to store the second sub-dataset of the multiple sub-dataset that follows in the sequence the first sub-dataset. The sequence may be provided in ascending or descending order.

In case a sub-dataset su1 of the multiple sub-datasets comprises a number of entries that is higher than the predefined maximum threshold, step (c) includes: in case the sub-dataset su1 fully fits into a data block of the defined data blocks store the sub-dataset into at least the data block; otherwise repeat steps (b)-(c) for the sub-dataset as being the dataset. In case a sub-dataset su2 of the multiple sub-datasets comprises a number of entries that is smaller than the predefined maximum threshold, step (c) comprises: in case the sub-dataset su2 fully or partially fits into a data block of the defined data blocks store the sub-dataset into at least the data block; otherwise repeat steps (b)-(c) for the sub-dataset as being the dataset.

The term "dataset" as used herein refers to a collection of data such as, for example, a data table, database or a list. The collection of data may be presented in tabular form. Each column may represent a particular variable or attribute. Each row may represent a given member, record or entry of the dataset.

According to an embodiment, the storing of the sub-dataset further comprises receiving a storage failure in response to storing the sub-dataset and repeating steps (b)-(c) for the sub-dataset as being the dataset. This may prevent eventual loss of data due to storage errors. The type or cause or origin of the storage failure may not be relevant for deciding whether to repeat steps (b)-(c) in this embodiment. Instead of repeating the storing of the sub-dataset, the present embodiment may immediately upon receiving a failure, repeat steps (b)-(c) as an alternative to that repetitive storage of the same sub-dataset. This may save processing resources that would otherwise be required for multiple storage attempts of the same sub-dataset.

According to an embodiment, the storage failure is caused by at least one of: the size of the sub-dataset being higher than the maximum amount of storage. The storage failure may be a non-recoverable failure. This embodiment may have the advantage of repeating steps (b)-(c) only for specific failures, e.g., non-recoverable failures. For example, if the storage failure is caused by a network disconnection or congestion, the repeating of steps (b)-(c) may not help solving or overcoming the failure problem as it may happen again when repeating steps (b)-(c).

According to an embodiment, the method further comprises removing from the data block of the defined data blocks data of the sub-dataset that is stored on the data block. This may prevent duplicating the data in the data blocks. The storage of the sub-dataset on the data block may be performed row by row e.g. by appending rows, and the storage failure may be received after storing a portion of the sub-dataset on the data block. This portion may be deleted as it may be duplicated in a subsequent storage of sub-datasets on the data block or other data blocks. This may save storage space.

According to an embodiment, the method further includes providing a backup data block, the storing of the sub-dataset on the data block further includes storing the sub-dataset on the backup data block, step (c) further includes for a subsequent iteration a first scenario including: receiving a storage failure in response to storing another sub-dataset of the multiple sub-datasets on the data block; removing content of the data block and copying the content of the backup data block into the data block, thereby removing from the data block data of the other sub-dataset; and repeating steps (b)-(c) for the other sub-dataset as being the dataset or a second scenario including: receiving a storage failure in response to storing another sub-dataset of the multiple sub-datasets by appending rows of the other sub-dataset to the sub-dataset on the data block; removing from the data block appended data of the other sub-dataset; and repeating steps (b)-(c) for the other sub-dataset as being the dataset.

According to an embodiment, the sub-dataset has a respective offset within the data block, the removing from the data block being performed using the offset of the sub-dataset.

These embodiments may provide an accurate and efficient method for extracting or removing specific data (e.g. data of the other sub-dataset) from the data block. This may prevent the duplication of data on the data blocks in case this specific data is not completely removed. This may thus save storage space or reduce the amount of storage space needed. Furthermore, this embodiment may prevent loss of data compared to the case where the removal of the specific data has caused the extraction of additional data from the data block.

According to an embodiment, in response to determining that the maximum amount of storage is smaller than a predefined maximum size the method comprises performing the first scenario; otherwise performing the second scenario. If the data block is rather empty (e.g. associated with a storage capacity smaller than the predefined maximum size), then the backup copy might be preferred, as less data needs to be backed up, whereas remembering the write offset(s) may be the method of choice for data blocks having a storage capacity that is higher than the predefined maximum size in order to save storage space.

According to an embodiment, in response to receiving a success storage message storing the other sub-dataset on the data block, and deleting data stored on the backup data block. The success storage may for example indicate that the data block comprises enough data and may thus not be able to receive or store further data. In this way the backup data block may be used for subsequent data blocks that are to be processed. This may save storage space and processing resources compared to the case of using for each data block an associated backup data block.

According to an embodiment, the determining that the sub-dataset fully fits into the data block further includes estimating a size of the sub-dataset based on an average size of each row of the sub-dataset, and in response to determining that the estimated size is smaller than the maximum amount of storage storing the sub-dataset in the data block.

According to an embodiment, the method further comprises in response to determining that the estimated size is higher than the storage capacity repeating steps (b)-(c) for the sub-dataset.

These embodiments may prevent storage failures and may thus save processing time that would otherwise be required for repeating the storage of the sub-dataset or for solving the storage failure upon receiving the storage failure.

According to an embodiment, the dataset comprises compressed data, defining the set of data blocks further comprises assigning to each data block of the set of data blocks a respective storage capacity, the determining that the values of the attribute of the sub-dataset belong to the data block further includes in response to determining that the size of the uncompressed content of the sub-dataset is smaller than the storage capacity storing the sub-dataset in the data block. Providing criteria for storing data in the data blocks other than the range of values of the attribute may increase the efficiency of the present method and may save processing resources that would otherwise be required for e.g. multiple storage attempts.

According to an embodiment, steps (b)-(c) are performed using a recursive divide and conquer process.

According to an embodiment, the method further comprises controlling the recursive divide and conquer process to define the set of the data blocks.

According to an embodiment, the divide and conquer process comprises Quicksort process, radix sorting process, insertion sort process or a combination thereof.

These embodiments may be seamlessly integrated with existing systems without additional undue burden to integration processes.

According to an embodiment, the predefined maximum threshold comprising the number of entries of the data block. In another example, the maximum threshold may be user-defined.

According to an embodiment, step (c) including upon storing the sub-dataset on the data block selecting a next sub-dataset, the next sub-dataset having a respective range of values that is immediately preceding or succeeding the range of values of the sub-dataset. In other words, the step (c) of "for each sub-dataset of the multiple datasets . . . " is performed on the multiple sub-datasets following their ascending or descending order. For example, assuming that step (b) results in sub-datasets S1 and S2, where S1 is ordered smaller than S2 because the values of the attribute in S1 are smaller than the values of the attribute in S2. In case of the ascending order, S1 may be first checked if it (fully) fits within the data block and if so S2 checked after that. However, if S1 does not fully fit in the data block then step (b) is performed on S1 which may result in two sub-datasets S11 and S12, where S11 is smaller than S12 because the values of the attribute in S11 are smaller than the values of the attribute in S12. In this case, S11 is first processed to check if it fully fits in the data block and then stored if it fully fits, then S12 followed by S2. In case of the descending order, S2 may be first checked if it fully fits within the data block and if so S1 checked after that.

In a further example embodiment, a computerized method for reorganizing dataset stored on a set of data blocks in a database system is provided. The computerized method comprises providing the dataset on a set of data blocks, each data block either having up to a predefined maximum number of entries of the dataset or storing entries of the dataset requiring up to a predefined maximum amount of storage; providing attribute value information for an attribute in the data set stored in data blocks, the attribute value information including at least the following: a lower bound for a minimum attribute value of a data block, an upper bound of the maximum attribute value of a data block; reorganizing the dataset by the attribute by the following steps: recursively using "divide and conquer sorting algorithms" (e.g. quicksort, radix sort, combinations thereof, . . . ) to organize the dataset to subsets fitting into the data blocks, the "divide and conquer sorting algorithms" recursively partitioning value range of the attribute and assigning entries of the dataset to resulting value range partitions stopping the "divide and conquer sorting algorithms" for each value range partition when entries of the dataset assigned to the respective value range partition fit into a data block; and storing the value range partitions generated by the "divide and conquer sorting algorithms" in the data blocks.

FIG. 1 depicts a functional block diagram illustrating a data processing system or computer system 100 according to an example embodiment of the present invention. The data processing system 100 may for example comprise an IBM i system.

The data processing system 100 comprises a computer system 101. The components of computer system 101 may include, but are not limited to, one or more processors or processing units 103, a storage system 111, a memory unit 105, and a bus 107 that couples various system components including memory unit 105 to processor 103. Storage system 111 may include, for example, a hard disk drive (HDD). Memory unit 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as a keyboard, a pointing device, a display 113, etc.; one or more devices that enable a user to interact with computer system 101; and/or any devices (e.g., network card, modem, etc.) that enable computer system 101 to communicate with one or more other computing devices. Such communication can occur via I/O interface(s) 119. Computer system 101 can communicate with one or more networks such as a local area network (LAN), a general wide area network (WAN), and/or a public network (e.g., the Internet) via network adapter 109. As depicted, network adapter 109 communicates with the other components of computer system 101 via bus 107.

Memory unit 105 may be configured to store applications that are executable on the processor 103. For example, the memory system 105 may include an operating system as well as application programs. The application programs may include a data sorting application 108 (e.g. a database application). The data storing application 108 may have access to at least one dataset (or data table) 127. For example, the data sorting application 108 may receive (automatically or upon request) as input the dataset 127, or may download the dataset 127 from a data source system 123. Memory unit 105 may contain metadata 135.

The data processing system 100 may further comprise data source system 123. The data source system 123 may, for example, include a Hadoop platform. The data source system 123 may provide and store dataset 127. The data source system 123 may be connected to the computer system 101 via one or more networks for example, the Internet, a local area network, a wide area network and/or a wireless network. In addition, or alternatively, the dataset 127 may be stored on the storage system 111 and/or on memory unit 105.

The dataset 127 may comprise one or more columns 131A, 131B, . . . 131N, wherein each column is represented by a respective attribute (e.g. "ID" and "Age"). The rows of the dataset 127 may comprise values of the attributes. The dataset 127 may for example comprise multiple sub-datasets 127A, 127B, . . . 127N. The sub-datasets 127A, 127B, . . . 127N are shown for clarity of the description and may be created before or while executing the present method.

The operation of the data processing system 100 will be described in details with reference to FIGS. 2-5.

Figure 2:
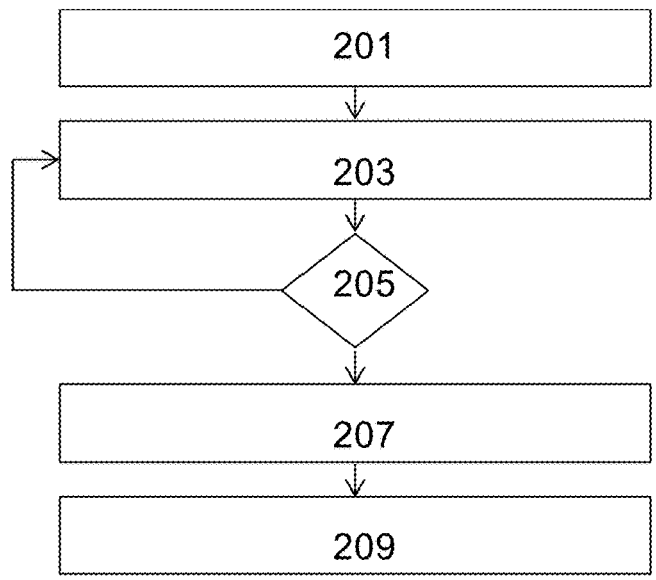
FIG. 2 is a flowchart of a method for sorting and storing a dataset.
Figure 2:
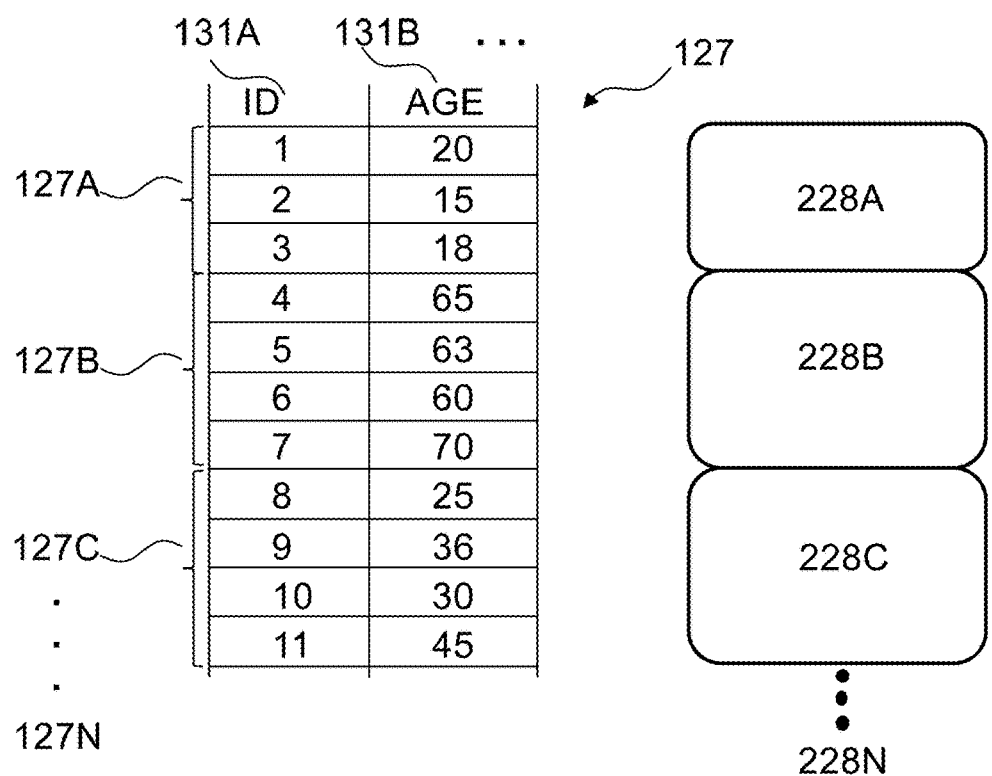

FIG. 2 is a flowchart of a method 200 for sorting and storing the dataset 127 in a sorted manner according to the present disclosure.

In step 201, a set of data blocks 228A, 228B, . . . 228N may be defined. The definition of the set of data blocks 228A, 228B, . . . 228N may comprise assigning a predefined maximum number of entries or rows of the dataset or a predefined maximum amount of storage to each data block of the set of data blocks 228A-N. The set of data blocks 228A, 228B, . . . 228N may be equally defined, e.g., having the same allocated storage space or maximum number of entries.

For simplicity of the description, FIG. 2 shows data blocks 228A, 228B, . . . 228N.

The predefined maximum amount of storage may be associated with physical storage space that may be divided into physical blocks. A physical block of space may be the smallest unit that can be allocated in data processing system 100. A physical block of space may contain multiple bits of information. Each data block 228A, 228B, . . . 228N may be stored on one or more physical blocks of space. The physical blocks that hold the data blocks 228A-N may be disk blocks that may be contiguous, linked, or indexed. The physical storage space may be allocated in the memory unit 105, storage system 111 and/or data source system 123.

For example, data blocks 228A, 228B, . . . 228N may contain or receive an equal or unequal number of rows compared to the number of rows of the dataset 127.

The definition of the data blocks may be performed so as to enable only the data sorting application 108 to access the allocated physical storage space, e.g., other programs or applications may not access the reserved physical space. In another example, the data sorting application 108 may control or configure other programs or applications to access the allocated physical storage space.

Step 201 (and following steps of FIG. 2) may be performed in response to receiving a request to store the dataset 127. In another embodiment, step 201 (and the following steps of FIG. 2) may automatically be performed e.g. on a periodic basis e.g. for reorganizing the dataset 127. For example, step 201 may automatically be invoked for newly stored datasets that are not yet sorted in accordance with the present disclosure, or for modified or updated datasets.

In step 203, the dataset 127 may be divided or split into a sequence of multiple sub-datasets 127A, 127B, . . . 127N. The division may be performed using values of the attribute of the dataset 127, e.g., attribute 131B. The multiple sub-datasets may be divided and ordered such that each sub-dataset of the multiple sub-datasets may have one value or a range of values of the attribute. Each pair of successive sub-datasets of the sequence are non-overlapping or overlapping at their respective extremum value of the attribute. For example, the dataset 127 may be divided in two sub-datasets e.g. sub1 and sub2. The first sub-dataset sub1 may comprise data having a range [min1, max1] of values of the attribute 131B. The second sub-dataset sub2 may comprise data having a range [min2, max2] of values of the attribute 131B, wherein max1 is smaller or equal to min2, and wherein min1 and min2 may or may not be equal to max1 and max2 respectively. For performing the division, a data structure (or an index) may for example be used. The data structure may enable access to the dataset 127 as the data structure may comprise an indexed field of the dataset 127 that corresponds to attribute 131B. Each record of the data structure may contain a value of the attribute 131B and a pointer or physical address of the corresponding record of the dataset 127. The dividing of the dataset 127 may be performed using the data structure. For example, an element of the data structure (e.g. pivot element or value) may be selected and elements of the data structure having an order within the data structure that is smaller than the order of the selected element may form a first sub-dataset of the dataset 127, while data elements having an order within the data structure higher than the order of the selected element provide another sub-dataset of the dataset 127. The order within the data structure may be indicative of the order of the values of the attribute 131B e.g. the values of the attribute 131B of the first-sub-dataset are all smaller than the values of the attribute 131B of the second sub-dataset. In other words, the dataset 127 may be reorganized so that all elements with values less than the pivot element come before the pivot, while all elements with values greater than the pivot element come after it (equal values can go either way). The dividing may for example be performed recursively using "divide and conquer sorting algorithms" (e.g. quicksort, radix sort, combinations thereof, . . . ) to organize the dataset 127 to subsets fitting into the data blocks, the "divide and conquer sorting algorithms" recursively partitioning value range of the attribute 131B and assigning entries of the dataset to resulting value range partitions or sub-datasets. The first or second sub-datasets may include the pivot value.

For each sub-dataset (e.g. sub-dataset 127B) of the multiple sub-datasets it is determined (step 205) if the sub-dataset fully fits into a given data block of the defined data blocks 228A-N. Step 205 may include comparing the number of entries or rows of the sub-dataset with the maximum number of entries of the given data block or comparing the amount of storage of the dub-dataset with the maximum amount of storage of the given data block in order to determine if the sub-dataset fully fits into the given data block or not. The given data block may be randomly selected out of the set of data blocks 228A-N. If the (step 207) sub-dataset 127B fully fits into the given data block of the defined data blocks 228A-N, the sub-dataset 127B may be stored on the given data block; otherwise steps 203-207 may be repeated for the sub-dataset 127B (e.g. sub-dataset 127B may be divided and steps 205-207 may be performed for each subdivision of the sub-dataset 127B). Steps 205-207 may be repeated for each sub-dataset of the dataset 127. The storing of the sub-dataset on the given data block comprises storing the sub-dataset on the physical space of the given data block. If in the first iteration a first sub-dataset has been stored on the given data block, in the second iteration when trying to store a second sub-dataset it may be checked whether the given data block has still free space in order to store the second sub-dataset; otherwise another data block of the set of data blocks 228A-N may be used for storing the second sub-dataset. Steps 205-207 may be performed on the sub-datasets following their ascending or descending order. For example, if the dataset 127 is divided into two sub-datasets s1 and s2 where s1 has values of the attribute 131B that are smaller than the values of the attribute 131B in s2. In this example, steps 205-207 may be performed in ascending order starting from s1 and then the following s2. If for example s1 does not fully fit in the data block, s1 is divided into s11 and s12 where s11 has values of the attribute 131B that are smaller than the values of the attribute 131B in s12, then the processing of steps 205-207 is performed in ascending order starting from s11, followed by s12 and then s2.

In another example, inquiry 205 may comprise determining if the sub-dataset at least partially fits into a given data block of the defined data blocks 228A-N. If the (step 207) sub-dataset 127B partially fits into the given data block of the defined data blocks 228A-N, a portion of the sub-dataset 127B may be stored on the given data block; otherwise steps 203)-207) may be repeated for the sub-dataset 127B. For example, the sub-dataset may be checked or determined to partially fits into the given data block only if the free or remaining free space in the given data block is smaller than a given threshold e.g. that is equal to a given number of rows or entries. In addition or alternatively, the sub-dataset may be checked or determined to partially fits into the given data block only if the sub-dataset comprises a number of entries that is smaller than a predefined maximum threshold. The predefined maximum threshold may for example be the number of entries in the given data block. If the sub-dataset comprises a number of entries that is higher than the predefined maximum threshold, it is checked whether the sub-dataset fully fits into the given data block as described above. In case a sub-dataset su1 comprises a number of entries that is higher than the predefined maximum threshold, the repeating of steps 203-207 may be performed after determining that sub-dataset su1 does not fully fit into a given data block. In case a sub-dataset su2 comprises a number of entries that is smaller than the predefined maximum threshold, the repeating of steps 203-207 may be performed after determining that sub-dataset su2 does not fully and partially fit into a given data block.

In step 209, for each data block of the set of data blocks 228A-N an attribute value information indicating a range of values of the attribute stored on the data block may be created or generated. This may enable a selective processing of at least part of the set data blocks using the attribute value information.

For example, each data block of the data blocks 228A-N may be identified or defined by a pair (or triplet etc.) of values (v1, v2) that are indicative of the attribute 131B. For example, the pair of values (v1, v2) may be equal to (min, max), where min (max) is the minimum (maximum) value of the attribute 131B that a data block 228A-N may contain, e.g. data blocks 228A-C may be defined by the pairs (10, 20), (60, 70) and (20, 60) respectively.

The attribute value information of the data blocks 228A-N may be stored as metadata 135 in computer system 101. For example, memory unit 105 may comprise metadata 135 that contains information about the defined data blocks 228A-N such as the range of values of the attribute 131B covered by each data block 228A-N. For example, the metadata may comprise the pair of values (v1, v2) in association with an indication of the corresponding data blocks 228A-N e.g. in the form of a map.

The data sorting application 108 includes instructions that when executed may perform steps 201-209. The data sorting application 108 may be an in-place algorithm that may require a small, constant amount of extra storage space in order to store the dataset 127 in a sorted format in accordance with the present disclosure. In an example, the set of data blocks 228A-N may or may not include at least part of the dataset 127 before performing steps 201-209.

Figure 3:
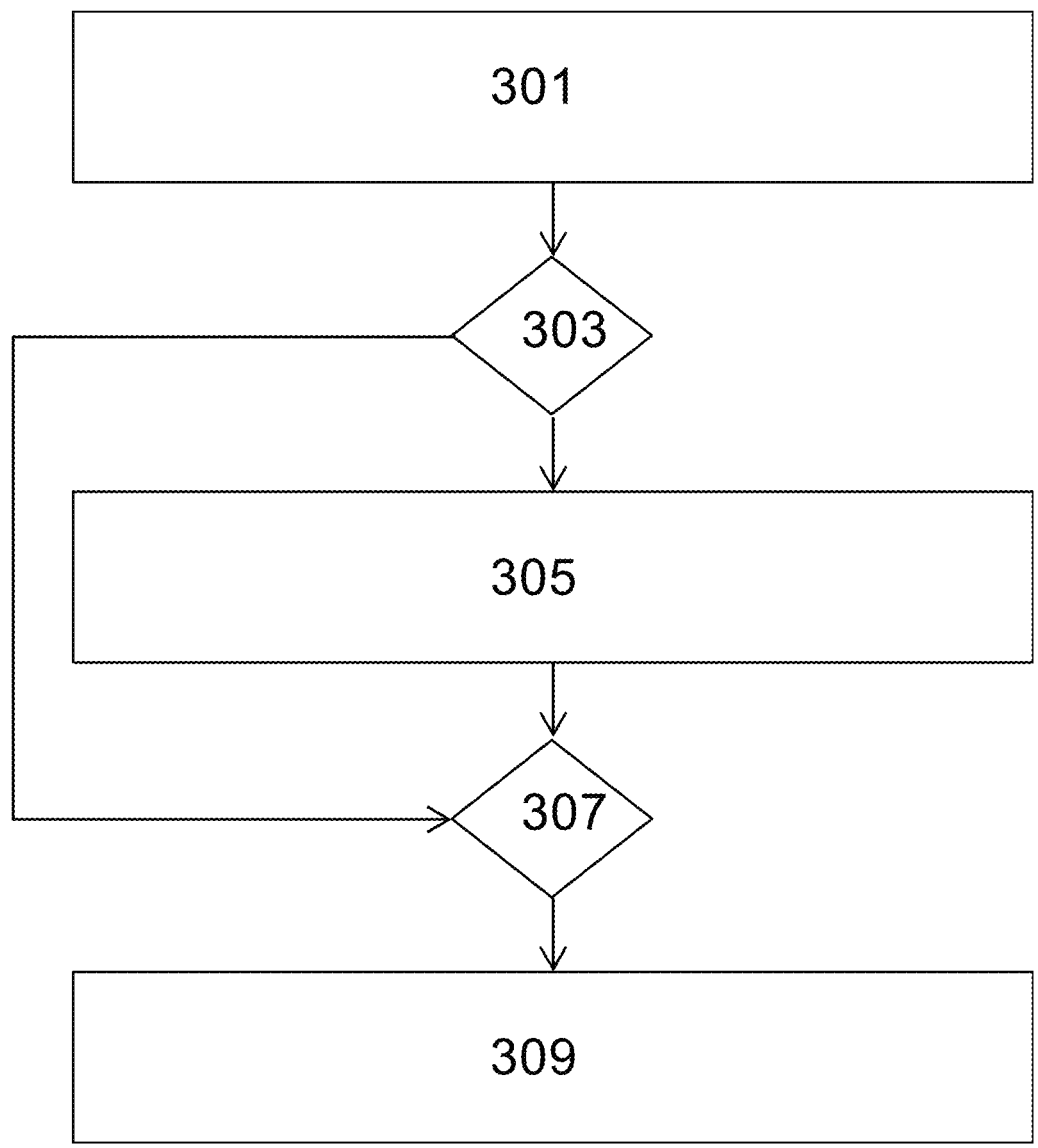
FIG. 3 is a flowchart of an exemplary method for storing sub-datasets on a data block.

FIG. 3 is a flowchart of an exemplary method for storing sub-datasets 127A (e.g. further detailing step 209) on a data block 228A-N. The repeating of steps 203-207 results in one or more iterations. As used herein, the term iteration refers to the repetition of steps e.g. (1)-(N) and also refers to the first or initial execution of steps (1)-(N). In other terms, a single repetition of steps (1)-(N) results in two iterations, the first iteration corresponds to the initial execution of steps (1)-(N) while the second iteration corresponds to the first repetition of steps (1)-(N).

In step 301, a backup data block may be provided. For example, a backup physical storage space may be assigned to the backup data block. The backup physical storage space may have a size that is larger than a predetermined minimum size threshold. For example, the predetermined minimum size threshold may comprise the highest size of the data blocks 228A-N.

For each iteration of the one or more iterations the execution of step 207 comprises the following steps 303-309.

Upon storing a current sub-dataset of the dataset 127 that fits in a given data block 228B on the given data block 228B, determining (inquiry 303) if the storage of the current sub-dataset is successful.

In case the storage of the current sub-dataset on the given data block 228B succeeds, the current sub-dataset may be stored in step 305 on the backup data block.

In case the storage of the current sub-dataset fails (e.g. by receiving a storage failure in response to storing the current sub-dataset), determining (inquiry 307) if the current sub-dataset is stored in addition with a previous sub-dataset of the dataset 127 stored on the given data block 228A in a previous iteration of the one or more iterations.

In case the current sub-dataset is being stored in addition with the previous sub-dataset, removing in step 309 content of the given data block 228A and copying the content of the backup data block into the given data block 228A. In this way the first sub-dataset may be removed from the given data block 228A.

Figure 4:
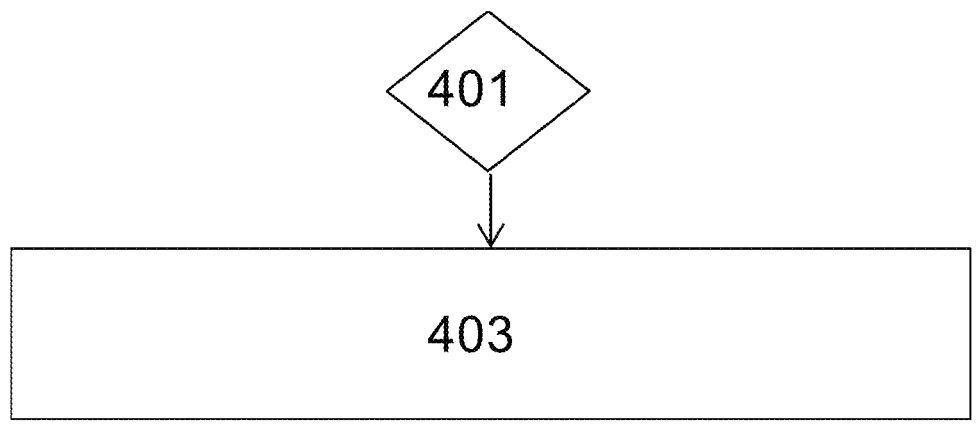
FIG. 4 is a flowchart of another exemplary method for storing sub-datasets on a data block.

FIG. 4 is a flowchart of another exemplary method for storing sub-datasets 127A-N (e.g. further detailing step 207) on a data block 228A-N. The repeating of steps 203-207 results in one or more iterations.

For each iteration of the one or more iterations the execution of step 207 comprises the following steps 401-403, wherein for a current iteration a given data block 228A may comprise a previous sub-dataset 127A of the dataset 127 from a previous iteration. The stored previous sub-dataset comprises rows.

Upon storing a current sub-dataset 127B of the dataset 127, that fits into a given data block 228B, on the given data block 228B, determining (inquiry 401) if the storage of the current sub-dataset is failed. The storage of the current sub-dataset may be performed by appending rows of the current sub-dataset 127B to rows of the previous sub-dataset 127A.

In case the storage of the current sub-dataset failed (e.g. by receiving a storage failure in response to storing the first sub-dataset), the current sub-dataset 127B may be removed in step 403 from the given data block 228A using the offset of the previous sub-dataset 127A.

Figure 5:
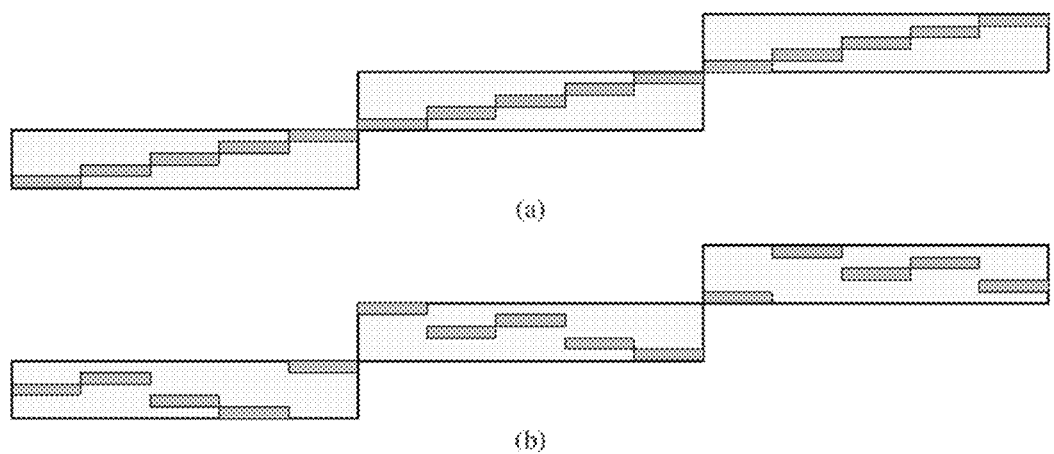
FIG. 5 illustrates three sorted data blocks containing five rows using different methods.

FIG. 5 illustrates three data blocks containing five rows each and being sorted using methods: (m1) fully sorting the rows, and (m2) dividing the rows into block-aligned range partitions.

The basic observation of the present method (m2) is that sorting the rows by organizing columns (e.g. 131B) almost exclusively serves the purpose of achieving effective usage of the attribute information that comprises range of values of the attribute for data blocks 228A-N. Thus, the actual order of the rows within the data blocks 228A-N may be irrelevant, as long as their order results in the same distribution of rows across the data blocks 228A-N and thus the same value range boundaries (min/max) of the data blocks. "min/max" refer to the minimum and maximum values of the attribute 131B in a given data block respectively.

To speed up the reorganization phase e.g. of the dataset 127, the present method may distribute the rows of the dataset 127 into block-aligned range partitions (e.g. sub-datasets 127A-N) rather than fully sorting the rows of the dataset 127.

Block-aligned range partitions 127A-N may have the following properties: Assume that data block b contains values of organizing column c (e.g. 131B) in range [$minc(b)$; $maxc(b)$] and $minc(b) < maxc(b)$. In other words, data block b is assigned the range of values [$minc(b)$; $maxc(b)$] of the attribute c.

1. If row r carries the value cr and $minc(b) < cr < maxc(b)$, then row r must be stored in b.
2. If row r carries the value $minc(b)$ and is stored in block $b' \neq b$, then $minc(b) = maxc(b')$.
3. If row r carries the value $maxc(b)$ and is stored in block $b' \neq b$, then $maxc(b) = minc(b')$.

Note that possibly $minc(b') = maxc(b')$.

Put differently, block-aligned range partitions exclusively divide the value range of an organizing column e.g. attribute 131B and overlap may occur at the min/max boundaries of data blocks. Both the order of the rows within a data block and the order of the data blocks may be undefined.

As illustrated in FIG. 5, block-aligned range partitions create exactly the same min/max data block range boundaries that would occur if the dataset 127 was fully sorted. Creating block aligned range partitions may be cheaper in term of required processing resources than a full sort, as it only requires sorting the rows up to the point at which all rows reside in the same data block in which they would be in the fully sorted table.

In the following further example details for performing at least part of the above described methods are described.

Creating Block-Aligned Range Partitions (e.g. Step 205)
Block-aligned range partitions (e.g. sub-datasets 127A-N) from the dataset 127 may be created using a sorting algorithm that adheres to the "divide and conquer" principle and applies it to the range of values to sort e.g. sorting the values of the attribute 131B. Such algorithms recursively partition the value range (e.g. of attribute 131B) and move rows into the partition that "owns" their value until all rows are sorted. To create block-aligned range partitions 127A-N, it is sufficient to recur only into those range partitions 127A-N which contain a data block 228A-N boundary. Partitions which are fully contained in a single data block do not need to be sorted further, as this would not influence the min/max values (e.g. of attribute 131B) of the data block and only change the order of the rows within the data block. This may provide an efficient method as it may need less sorting effort. In the following different sorting methods in accordance with the present disclosure may be described.

Partitioning with Quicksort

Quicksort may pick a pivot value p (e.g. a value of attribute 131B) and creates two range partitions, one for values that are smaller than p ($<p$) and one for values that are higher than p ($>=p$). Quicksort may move rows into their respective partition and then recurses into each of the partitions. However, to create block-aligned range partitions it is sufficient to recurse into those partitions which overlap more than one data block (i. e. they contain a block or range boundary).

Radix Partitioning

Another such algorithm is radix sort. Radix sort may group rows by the individual digits (or bits) of their sort keys which share the same significant position and value. The resulting groups are effectively value range partitions.

Partitioning with Quicksort+Insertion Sort

Quicksort may be combined with another sorting algorithm such as insertion sort such as to divide the dataset 127. Quicksort may be efficient on large partitions but may need to execute lots of recursion steps towards the end with partition sizes decreasing. Insertion sort, which repeatedly searches for the smallest yet unsorted row and swaps it to the front, generally lies in O(n2) but is efficient when the dataset is nearly sorted. In the latter case insertion sort only needs to search few rows, so that the quadratic cost does not come to play. For this reason, the present method may run quicksort on the dataset down to a minimal partition size first and then use insertion sort on the partitions to complete the sort. In order to create block-aligned range partitions: Quicksort may first recursively subdivide a partition which contains a particular data block boundary. As soon as the partition falls below a certain size, insertion sort is used. However, insertion sort does not need to sort the partition fully. Insert sort only needs to advance up to the data block boundary. Moreover, if the boundary is closer to the end of the partition than to its beginning, then insertion sort should approach the boundary from the end by repeatedly searching for the largest yet unsorted value in the partition and swapping it to the end.

External Partitioning Approach

Quicksort may be an internal sorting algorithm, meaning that the entire dataset 127 fits in main memory e.g. memory unit 105. If the dataset 127 is larger than that available memory an external algorithm may be used. Radix sort, for example, may be used if the dataset 127 exceeds the available main memory. For that, the present method may use radix sort to divide the rows of the dataset 127 into value partitions that fit into main memory in a first step, and second, quicksort may be used in the way described above on all radix partitions that overlap more than one data block.

In the following a method for determining data block boundaries (e.g. for defining data blocks as in step 201) is described.

The method to create block-aligned range partitions described above may comprise providing data block boundaries of each data block before all rows have been assigned to the data block. In order to selectively access storage units, such as pages or extents, the data block boundaries may be known in advance if all rows (e.g. of the dataset 127) consume the same amount of storage. This effectively means that the rows may not be compressed. Supporting attribute value information on data blocks that correspond to (or that are used for) storage units in presence of variable-length and/or compressed rows may require:

1. a heuristic to estimate whether a given range partition e.g. 127A (of the sorting algorithm) fits into a given data block 228A-N and
2. a way to remove the rows again from the data block in case the heuristic wrongly estimated a range partition to fit into the data block.

If a sorting algorithm produces a new range partition p of rows that are to be ordered below all other yet unprocessed rows, the heuristic is invoked. If the heuristic determines that p may not fit into the current data block, then the sorting algorithm may further subdivide p into two (or more) range partitions $p_{low}$ and $p_{high}$ and the process of sorting is repeated recursively with $p_{low}$. If p is estimated to fit into data block b, then all rows of p are added to b. If adding failed, the added rows must be removed from b and p must be further subdivided. For example, if adding succeeded, the sorting algorithm may be controlled or configured to produce a next range partition.

One such heuristic, for example, could measure the average storage consumption s of one row. A range partition of n rows is estimated to fit into data block b only if at least $s*n+\epsilon$ bytes of storage are available in b. At this, $\epsilon \geq 0$ is a constant that acts as a safety margin.

Another more conservative heuristic could assume the rows of a range partition to fit into data block b if their uncompressed storage size is available in b. Naturally, weighted combinations of individual heuristics are possible.

Removing rows of a range partition 127A that turned out to exceed the storage of the data block 228A, can be done as follows. In one example, the method may keep a backup copy of the data block 228A before adding the partition. In case adding the partition succeeds, the backup copy becomes obsolete and its space can be reused for the next backup copy. In case adding failed, the content of the data block 228A is replaced with the backup copy.

Alternatively, to remove rows, the write offset behind the last row of rows of a first partition (or sub-dataset 127A) may be remembered or saved before adding the partition into the data block 228A. If new rows of a second partition are always appended, then the rows of the second range partition are all stored behind this offset. To remove the new rows, the write offset is restored to the state before adding the second partition. In more complicated page layouts, such as the layout of DB2 BLU, which appends new rows to one of many storage banks within one page, the write offsets of all these banks may be saved.

Moreover, a combination of techniques may be used for deleting the rows as well: if the data block is rather empty (e.g. the size of the data block is smaller than the predefined maximum size), then the method using the backup copy might be used, as less data needs to be backed up, whereas the method saving the write offset(s) may be used for rather full (e.g. the size of the data block is larger than the predefined maximum size) data blocks. Also, for systems utilizing local compression dictionaries (such as DB2 BLU's page-local dictionaries), the write offset(s) may be saved at first until the added rows cause the local dictionaries to change. This may require re-coding all rows in the scope of the local dictionary, which may not be undone using the write offset(s). At this point, a backup copy of the data block may be created up to the saved write offset(s).

In the following a tolerated overlap method is described: The method of block-aligned range partitions described above may optionally be relaxed allowing the value ranges (of attribute 131B) of data blocks a low degree of overlap in the interest of saving sorting costs. If the sorting algorithm produced a range partition p that does not exceed $\delta$ rows, then p is not further subdivided even if it contains a data block boundary. Through this, the first or last row in a data block can be located at most positions away from the place where it would be located in a fully sorted sequence.

In the following an alternative method for defining block boundaries (e.g. as in step 201) is described:

In systems employing data block boundaries that do not correspond to the underlying storage units the data block boundaries can be considered arbitrary to some degree. As an alternative example to the example outlined above, in such systems the sorting algorithm may be configured to define the data block boundaries. As stated above, the sorting algorithm recursively partitions the value range. If this results in a range partition that roughly corresponds to a desired number of rows per data block n, the partition is defined a data block and its min/max values are added to the attribute value information on data blocks to the metadata 135. If the partition contains more than $n+\varepsilon$ rows ($\varepsilon>0$), then it is further subdivided.

In case of skewed data, a range partition $p_{small}$ with very few records can occur. In this case the next partition p' is subdivided into $p'_{low}$ and $p'_{high}$ until $p'_{low}$ is small enough to be concatenated with $p_{small}$ to define the next data block of at most $n+\varepsilon$ rows.

In the following methods for saving of partition boundaries is described:

As described above, the employed sorting algorithms produce value-range partitions that are recursively subdivided until they do not contain data block boundaries. This may result in value-range partitions that are entirely contained within a data block. The boundaries of such partitions are too fine-grained to be included in the information or metadata that describes the data blocks. In the alternative approach above, such partitions would be regarded as too small and concatenated with adjacent partitions.

If v is the maximal value of the value range partition below a given partition boundary, then all rows before and after the boundary carry values ≤v and ≥v, respectively. In order to exploit this information, the following methods may be used.

FIG. 6 depicts a table 601. The table 601 lists rows that can be skipped when processing a query predicate on a column of a dataset.

Partition Boundaries in Page Header

The tuple offsets or indexes where the partition boundaries occurred may be saved e.g. in the metadata 135 and/or in the header of every data page. Note that data pages may not necessarily correspond to data blocks. For every partition boundary, also the maximal value v of the value range partition below the boundary is recorded. Using this, the partition boundaries are exploited by queries with constant equality and range predicates on organizing columns e.g. attribute 131B. Table 601 of FIG. 6 describes the rows they can safely ignore. In addition, constant query predicates for which an upper and/or lower bound can be derived, e. g. c LIKE 'A %', can be (conceptually) rewritten to complex predicates that contain some of the primitive ones listed in Table 601, e. g. c>='A' AND c<'B' AND c LIKE 'A %'. The latter form can then exploit the partition boundaries and thus skip unnecessary rows.

Partition Boundary Markers

Alternatively, special marker values to indicate a value-range partition boundary are inserted between the rows. Constant equality and range predicates of the form "c<, ≤ or =x" can exploit this. When scanning a data block for rows which satisfy such a predicate, the scan may as well look out for values greater than x until it has found at least one. When the scan encounters a partition boundary marker and has previously seen a value >x then it can stop scanning the current data block. It is guaranteed to have retrieved all rows of this data block which match the predicate. Similarly to the above method, constant query predicates for which an upper bound can be derived, can conceptually be rewritten to complex predicates to exploit the partition boundaries. While the partition boundary markers may require less storage, do not have to work on page granularity, and do without modifications of the page header.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

The invention may be described by the following feature combinations.

A computer implemented method for sorting and storing a dataset, the dataset comprising at least one attribute, the method comprising a) defining a set of data blocks and assigning to each data block of the set of data blocks a predefined maximum number of entries of the dataset or a predefined maximum amount of storage, b) dividing the dataset into a sequence of multiple sub-datasets each having one value or a range of values of the attribute, wherein each pair of successive sub-datasets of the sequence are non-overlapping or overlapping at their respective extremum value of the attribute, c) for each sub-dataset of the multiple sub-datasets: in case the sub-dataset fully or partially fits into a data block of the defined data blocks storing the sub-dataset on at least the data block; otherwise repeating steps b)-c) for the sub-dataset as being the dataset, the sub-dataset that partially fits into the data block comprising a number of entries that is smaller than a predefined maximum threshold, and d) creating for each data block of the set of data blocks an attribute value information indicating a range of values of the attribute stored on the data block for selectively processing at least part of the set data blocks using the attribute value information.

The previous method, the storing of the sub-dataset further comprising receiving a storage failure in response to storing the sub-dataset and repeating steps b)-c) for the sub-dataset as being the dataset, the storage failure being caused by at least one of: the size of the sub-dataset being higher than the maximum amount of storage.

The previous method, the predefined maximum threshold comprising the number of entries of the data block.

The previous method comprising upon storing the sub-dataset on the data block selecting a next sub-dataset, the next sub-dataset having a respective range of values that is immediately preceding or succeeding the range of values of the sub-dataset.

The previous method, further comprising removing from the data block of the defined data blocks data of the sub-dataset that is stored on the data block.

The method of any of the previous feature combinations, further comprising: providing a backup data block, the storing of the sub-dataset on the data block further comprising storing the sub-dataset on the backup data block, further comprising for a subsequent iteration any one of the following: a first scenario comprising receiving a storage failure in response to storing another sub-dataset of the multiple sub-datasets on the data block, removing content of the data block and copying the content of the backup data block into the data block, thereby removing from the data block data of the other sub-dataset, and repeating steps for the other sub-dataset as being the dataset. And a second scenario comprising receiving a storage failure in response to storing another sub-dataset of the multiple sub-datasets by appending rows of the other sub-dataset to the sub-dataset on the data block, removing from the data block appended data of the other sub-dataset, and repeating steps for the other sub-dataset as being the dataset.

The previous method, the sub-dataset having a respective offset within the data block, the removing from the data block being performed using the offset the sub-dataset.

The previous method, in response to determining that the maximum amount of storage assigned to the data block is smaller than a predefined maximum size performing the first scenario; otherwise performing the second scenario.

The previous method, in response to receiving a success storage message storing the other sub-dataset on the data block, and deleting data stored on the backup data block.

The method of any of the previous feature combinations, the determining that the sub-dataset fully fits into the data block comprising estimating a size of the sub-dataset based on an average size of each row of the sub-dataset, and in response to determining that the estimated size is smaller than the maximum amount of storage storing the sub-dataset in the data block.

The previous method, further comprising in response to determining that the estimated size is higher than the storage capacity repeating steps for the sub-dataset.

The method of any of the previous feature combinations, the dataset comprising compressed data, the determining that the sub-dataset fully fits into the data block further in response to determining that the size of the uncompressed content of the sub-dataset is smaller than the maximum amount of storage storing the sub-dataset in the data block.

The method of any of the previous feature combinations, steps being performed using a recursive divide and conquer process.

The previous method, further comprising controlling the recursive divide and conquer process to define the set of the data blocks.

The previous method, the divide and conquer process comprising Quicksort process, radix sorting process, insertion sort process or a combination thereof.

The method of any of the previous feature combinations, further comprising generating a multidimensional data structure for representing a portion of the set of the data blocks that comprises data, for each data block of the portion of data blocks adding a respective data element into the multidimensional data structure, the data element comprising the attribute value information, receiving a query having a selection condition on the attribute, selecting data elements of the multidimensional data structure whose attribute value information satisfies the received query, executing the received query on the data blocks that correspond to the selected data elements.

What is claimed is:

1. A computer system for sorting and storing a dataset, the dataset comprising rows, each row comprising a value associated with an attribute, the computer system comprising:
   one or more computer processors, one or more computer-readable storage media, and program instructions stored on the one or more of the computer-readable storage media for execution by at least one of the one or more processors, the program instructions comprising:
   program instructions to define a set of data blocks, each data block of the set of data blocks having a predefined maximum number of entries;
   program instructions to define a backup data block having a backup predefined maximum number of entries which is greater than the predefined maximum number of entries;
   program instructions to randomly divide the dataset into a sequence of multiple equally sized sub datasets each comprising a different range of values associated with the attribute, wherein each pair of successive sub-datasets overlap at their respective extremum value of the attribute, and wherein each of the multiple sub-datasets comprises fewer rows than each of the predefined maximum number of entries;
   program instructions to store the values of each sub-dataset on a respective data block in an undefined order, wherein each value of each row is stored as a single entry on the respective data block;
   program instructions to store the values of each sub-dataset on the backup data block;
   program instructions to store subsequent sub-datasets on a subsequent data block, an attribute associated with each subsequent sub-dataset having a respective range of values overlapping at their respective extremum value immediately preceding or succeeding the previous range of values associated with the attribute of the sub-dataset; and
   program instructions to create for each data block an attribute value information indicating the range of values of the attribute stored on the data block for selectively processing at least part of the set of data blocks using the attribute value information.

2. The computer system of claim 1, wherein the program instructions to store the values of each sub-dataset further comprises:
   program instructions to select a next sub-dataset from the sequence of sub datasets, the next sub dataset having a respective range of values that is immediately preceding or succeeding the range of values of the sub-dataset.

3. The computer system of claim 1, further comprising:
   program instructions to remove from the data block, data of the sub dataset that is stored on the data block.

4. The computer system of claim 1, wherein the dataset further comprises compressed data.

5. The computer system of claim 1, wherein the program instructions to randomly divide the dataset further comprises:
   program instructions to use a recursive divide and conquer process.

6. A computer system for sorting and storing a dataset, the dataset comprising rows, each row comprising a value associated with an attribute, the computer system comprising:
- one or more computer processors, one or more computer-readable storage media, and program instructions stored on the one or more of the computer-readable storage media for execution by at least one of the one or more processors, the program instructions comprising:
- program instructions to define a set of data blocks, each data block of the set of data blocks having a predefined maximum number of entries;
- program instructions to define a backup data block having a backup predefined maximum number of entries which is greater than the predefined maximum number of entries;
- program instructions to randomly divide the dataset into a sequence of multiple equally sized sub datasets each comprising a different range of values associated with the attribute, wherein each pair of successive sub-datasets overlap at their respective extremum value of the attribute, and wherein each of the multiple sub-datasets comprises fewer rows than each of the predefined maximum number of entries;
- program instructions to store the values of each sub-dataset on a respective data block in an undefined order, wherein each value of each row is stored as a single entry on the respective data block;
- program instructions to receive a storage failure notification in response to storing one of the sub-datasets on one of the data blocks and the number of rows of the one sub dataset is greater than the number of predefined maximum number of entries;
- program instructions to replace content of the one sub-dataset with a previous content of the one sub-dataset from the backup data block; and
- program instructions to create for each data block an attribute value information indicating the range of values of the attribute stored on the data block for selectively processing at least part of the set of data blocks using the attribute value information.

7. The computer system of claim 6, wherein the program instructions to store the values of each sub-dataset further comprises:
- program instructions to select a next sub-dataset, the next sub-dataset having a respective range of values that is immediately preceding or succeeding the range of values of the sub-dataset.

8. The computer system of claim 6, further comprising:
- removing from the data block, data of the sub dataset that is stored on the data block.

9. The computer system of claim 6, wherein program instructions to randomly dividing the dataset into a sequence of multiple sub-datasets further comprises:
- program instructions to use a recursive divide and conquer process; and
- program instructions to control the recursive divide and conquer process to define the set of the data blocks.

10. The computer system of claim 9, wherein the divide and conquer process comprising Quicksort process, radix sorting process, insertion sort process or a combination thereof.

* * * * *